United States Patent Office 3,396,007
Patented Aug. 6, 1968

3,396,007
COMPOSITION AND METHOD FOR STIMULATING PLANT GROWTH
Stanley J. Strycker, Midland, Mich., assignor to The Dow Chemical Company, Midland, Mich., a corporation of Delaware
No Drawing. Original application Sept. 10, 1963, Ser. No. 307,788. Divided and this application Apr. 21, 1966, Ser. No. 560,398
3 Claims. (Cl. 71—77)

ABSTRACT OF THE DISCLOSURE

The present invention is directed to methods and compositions for the alteration of the growth of plants. The active agent of these methods and compositions is a compound of the formula

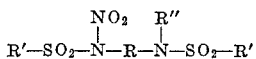

wherein R represents a divalent hydrocarbonylene radical selected from the group consisting of alkylene being of from 2 to 10, inclusive, carbon atoms, 2-butenylene, cyclohexylene, and cyclohexylenedimethylene; R' represents a member selected from the group consisting of loweralkyl being of from 1 to 4, inclusive, carbon atoms, phenyl, and substituted phenyl; and R" represents a member selected from the group consisting of hydrogen and nitro.

CROSS-REFERENCES TO RELATED APPLICATIONS

This is a division of copending application Ser. No. 307,788, filed Sept. 10, 1963, which has since been abandoned in favor of a continuation-in-part application, Ser. No. 609,295, filed Jan. 16, 1967.

DETAILED DESCRIPTION OF THE INVENTION

The present invention is directed to nitrosulfonamide compound of the formula

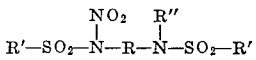

and to methods and compositions employing such compound for the modification and alteration of the growth of numerous organisms. In this and succeeding formulae, R represents a divalent hydrocarbonylene radical selected from the group consisting of alkylene being of from 2 to 10, inclusive, carbon atoms, 2-butenylene, cyclohexylene, and cyclohexylenedimethylene; R' represents a member selected from the group consisting of loweralkyl being of from 1 to 4, inclusive, carbon atoms, phenyl, and substituted phenyl; and R" represents a member selected from the group consisting of hydrogen and nitro. These novel compounds are oils or crystalline solid materials. They are somewhat soluble in many common organic solvents and of low solubility in water.

In the present specification and claims, the term "alkylene" is employed to refer to straight-chain divalent radicals as well as to branched-chain divalent radicals; and the term "substituted phenyl" refers to a phenyl radical which is ring substituted with one or more substituent moieties selected from the group consisting of halo, loweralkyl, nitro, and carboloweralkoxy. Representative alkylene radicals include ethylene, propylene, tetramethylene, 2-ethyltrimethylene, hexamethylene, nonamethylene, 1,8-dimethyloctamethylene, and heptamethylene; and representative substituted phenyl radicals include tolyl, xylyl, bromophenyl, dichlorophenyl, tribromophenyl, trimethylphenyl, chloroxylyl, nitrotolyl, dinitrophenyl, 2-chloro-4-tertiary-butylphenyl, tetramethylphenyl, and 3,5-bis(carbomethoxy)phenyl.

Where every substituent moiety is halo and/or loweralkyl, the substituted phenyl raical can be substituted by, subject only to known factors of steric hindrance, up to and including five substituent moieties. Where not every substituent moiety is halo and/or loweralkyl, the substituted phenyl radical can be substituted by one or two substituent moieties.

The nitrosulfonamide compounds of the present invention are prepared by nitrating a hydrocarbonylenedisulfonamide compound of the formula

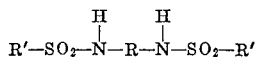

The nitration can be effected by employing any of numerous nitrating agents such as, for example, nitric acid, fuming nitric acid, a mixture of nitric and sulfuric acid, other mixtures having as a major component nitric acid, nitronium tetrafluoroborate (that is, $NO_2BF_4$), and dinitrogen pentoxide. Preferably, where R" is nitro, the fuming nitric acid is employed.

The reaction is conveniently carried out in the presence of an inert reaction medium, preferably, an organic liquid. Suitable organic liquids are acetic anhydride, methylene chloride, and nitromethane. However, where R" represents nitro, the use of nitrating agent as both reactant and inert liquid reaction medium results in higher yields and is preferred.

Where R" represents hydrogen, preferred embodiments of the present method include the use of nitric acid (as nitrating agent) in acetic anhydride (as inert liquid reaction medium), the use of nitronium fluoroborate in inert liquid reaction medium such as nitromethane or methylene chloride, and the use of dinitrogen pentoxide in appropriate inert liquid reaction medium, such as chloroform.

The amounts of the reactants to be employed are not critical, some of the desired product compound being obtained when employing the reactants in any amounts. Where R" represents nitro, the reaction consumes the reactants in amounts which represent one molecular proportion of hydrocarbonylenedisulfonamide and two molecular proportions of nitrating agent. However, the use of hydrocarbonylenedisulfonamide in an amount which represents one molecular proportion and nitrating agent in an amount which represents an excess of the two molecular proportions consumed, such as five to ten molecular proportions of nitrating agent, is preferred. Where R" represents hydrogen, the reaction consumes the reactants in amounts which represent equimolecular proportions; the use of such proportions results in higher yields and is preferred.

The reaction takes place smoothly at temperatures between —20 and 25° C. and preferably at temperatures between —5 and 10° C., with the production of the desired product in the reaction mixture.

In carrying out the reaction, the reactants are contacted together in any convenient fashion and maintained for a period of time in the reaction temperature range to complete the reaction. Some of the desired product compound is formed immediately upon the contacting of the reactants; however, the yield of the desired product compound is increased by permitting the reaction mixture to stand for a period of time.

After the completion of the reaction, the desired product compound can be separated from the reaction mixture by filtration and/or the reaction medium removed by distillation or evaporation under subatmospheric pressure. As a result of such operations, the desired product compound is obtained as a residue. This residue can be used without purification or can be purified by conventional procedures, such as, for example, washing with water, washing with inert liquid reaction medium, or recrystallization.

Where compound of the present invention contains a nitro substituent moiety on a substituted phenyl radical, such compound can be prepared in a modified method of the above synthesis. Such modified synthesis comprises nitrating a hydrocarbonylenedisulfonamide compound wherein the phenyl or substituted phenyl radical bears no nitro substituent moiety to introduce onto the phenyl or substituted phenyl radicals one or more nitro substituent moieties simultaneously with the introduction of nitro moieties onto the nitrogen atom of the sulfonamide function. The reaction conditions in such modified method are essentially the same as those of the method as hereinbefore discussed. However, as will be understood by those skilled in the art, the preferred amounts of the employed reactants are those which represent one molecular proportion of hydrocarbonylenedisulfonamide, and a number of molecular proportions of nitrating agent equal to the total number of nitro moieties to be introduced into the hydrocarbonylenedisulfonamide compound. Typically, the nitro substituents on the phenyl or substituted phenyl radical follow the conventional substituent position rules.

The following examples illustrate the invention but are not to be construed as limiting.

Example 1.—N,N'-ethylenebis(N-nitrobenzenesulfonamide)

A quantity of fuming nitric acid having a specific gravity of 1.5 was cooled to a temperature of about 0° C. N,N'-ethylenebis(benzenesulfonamide) (10 grams; 0.027 mole) was added to 55 milliliters of the cooled fuming nitric acid. The addition was carried out portionwise over a period of time so that the temperature of the resulting reaction mixture remained below 5° C. The reaction mixture was maintained at a temperature of 0° C. for 1½ hours with stirring. Thereafter, the reaction mixture was mixed with a quantity of water at a temperature of 0° C., during which the N,N'-ethylenebis(N-nitrobenzene-sulfonamide) product crystallized in the mixture. The mixture was then permitted, as a matter of convenience, to stand for a period of about 60 hours.

The product was separated from the mixture by filtration and dried. After recrystallization from toluene, the product was found to melt, with decomposition, at 157–157.5° C.

Example 2.—N,N'-octamethylenebis(N-nitromethanesulfonamide)

N,N' - octamethylenebis(methanesulfonamide) (10 grams; 0.033 mole) was added portionwise and with stirring to 80 milliliters of fuming nitric acid, having a specific gravity of 1.5 and at a temperature of −2° C. During the addition, the temperature of the resulting reaction mixture rose to about 3° C. The resulting reaction mixture was stirred for a period of 1 hour at a temperature of about 0° C. and then mixed with 800 milliliters of water at a temperature of about 0° C. During the mixing, the N,N'-octamethylenebis(N-nitromethanesulfonamide) product crystallized in the mixture. The mixture was stirred for about 1 hour, with the temperature permitted to rise spontaneously to that of room temperature. Thereafter, the product was separated as a residue and dried. After several recrystallizations from ethanol, the product was found to melt at 77–78° C.

Example 3.—N-nitro-N,N'-propylenebis(methanesulfonamide)

A quantity of acetic anhydride is cooled to a temperature of from −10 to −15° C. To 25 milliliters of the cooled acetic anhydride are added portionwise over a period of time and with stirring 4.4 milliliters of fuming nitric acid having a specific gravity of 1.5 (0.1 mole). The addition is carried out so that the temperature of the resulting mixture at no time exceeds 5° C.

Thereafter, a second cooled mixture is similarly prepared from 25 milliliters of acetic anhydride at a temperature of −10° to −15° C. and 23.0 grams of N,N'-propylenebis(methanesulfonamide) (0.1 mole). The mixture containing the nitric acid is then added to the mixture containing the sulfonamide compound, portionwise, over a period of time so that the temperature of the resulting reaction mixture does not rise above 5° C. After the addition has been completed, the reaction mixture is maintained at the temperature range of 0° to 5° C. for 4 hours with stirring. The reaction mixture is thereafter diluted with a quantity of ice water, and the diluted reaction mixture filtered to separate the N-nitro-N,N'-propylenebis(methanesulfonamide) product which is found to melt at 108–110.5° C. The compound has the following structural formula

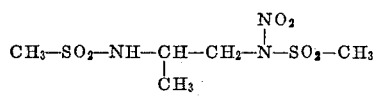

In a similar manner, other compounds representative of the present invention are prepared as follows.

From N,N'-trimethylenebis(methanesulfonamide) and fuming nitric acid, N,N'-trimethylenebis(N-nitro-methanesulfonamide) product melting at 66.5–67° C.

From N,N' - 2-butenylenebis(3,4-bis(carboethoxy)benzenesulfonamide) and fuming nitric acid, N,N'-2-butenylenebis(3,5 - bis(carboethoxy) - N - nitrobenzenesulfonamide) product. The product has a molecular weight of 744.7.

From N,N' - hexamethylenebis(1-butanesulfonamide) and a mixture of nitric and sulfuric acids, a white crystalline N,N' - hexamethylenebis(N-nitro-1-butanesulfonamide) product melting at 68–69.5° C.

From N,N' - 1,4-cyclohexylenebis(pentachlorobenzenesulfonamide) and fuming nitric acid, N,N'-1,4-cyclohexylenebis(pentachloro - N-nitrobenzenesulfonamide) product (molecular weight of 829.0).

From N,N' - ethylenebis(methanesulfonamide) and fuming nitric acid, N,N'-ethylenebis(N-nitromethanesulfonamide) product melting at 156.5–157.0° C.

From N,N' - 2 - butenylenebis(3,5-dimethylbenzenesulfonamide) and fuming nitric acid, N,N'-2-butenylenebis-(N-nitro-3,5-dimethylbenzenesulfonamide) product having a molecular weight of 512.6.

From N,N' - tetramethylenebis(methanesulfonamide) and fuming nitric acid, a white crystalline N,N'-tetramethylenebis(N-nitromethanesulfonamide) product melting at 132–133.5° C.

From N,N'-hexamethylenebis(ethanesulfonamide) and fuming nitric acid, N,N'-hexamethylenebis(N-nitroethanesulfonamide). The product is a white crystalline solid melting at 66–68° C.

From N,N'-ethylenebis(1-propanesulfonamide) and nitronium tetrafluoroborate, with nitromethane as inert liquid reaction medium, N-nitro-N,N'-ethylenebis(1-propanesulfonamide) product having a molecular weight of 317.4.

From N,N' - hexamethylenebis(methanesulfonamide) and fuming nitric acid, N,N'-hexamethylenebis(N-nitromethanesulfonamide) product melting at 97.5–98.5° C.

From N,N'-decamethylenebis(3-carbomethoxy-5-nitrobenzenesulfonamide) and fuming nitric acid, N,N'-decamethylenebis(3 - carbomethoxy - N,5 - dinitrobenzenesulfonamide) product having a molecular weight of 720.7.

From N,N' - hexamethylenebis(benzenesulfonamide) and fuming nitric acid, a solid N,N'-hexamethylenebis-(N-nitrobenzenesulfonamide) product melting at 141–142° C.

From N,N' - decamethylenebis(methanesulfonamide) and nitronium tetrafluoroborate, with methylene chloride as inert liquid reaction medium, N-nitro-N,N'-decamethylenebis(methanesulfonamide) product having a molecular weight of 373.5.

From N,N' - pentamethylenebis(methanesulfonamide) and fuming nitric acid, N,N'-pentamethylenebis(N-nitromethanesulfonamide) product. The product is a white crystalline solid melting at 85–86° C.

From N,N' - 1,4-cyclohexylenebis(5-bromo-m-toluenesulfonamide) and fuming nitric acid, N,N'-1,4-cyclohexylenebis(N - nitro-5-bromo-m-toluenesulfonamide) product (molecular weight of 670.4).

From N,N' - decamethylenebis(2,4,5-trichlorobenzenesulfonamide) and fuming nitric acid, N,N'-decamethylenebis(N-nitro-2,4,5-trichlorobenzenesulfonamide) product (molecular weight of 749.3).

From N,N' - pentamethylenebis(benzenesulfonamide) and fuming nitric acid, N,N'-pentamethylenebis(N-nitrobenzenesulfonamide) product melting at 113–114° C.

From N,N'-1,4-cyclohexylenedimethylenebis(benzenesulfonamide) and fuming nitric acid, in acetic anhydride, N - nitro - N,N' - 1,4 - cyclohexylenedimethylenebis(benzenesulfonamide) product having a molecular weight of 467.6.

From N,N'-ethylenebis(ethanesulfonamide) and fuming nitric acid, N,N'-ethylenebis(N-nitroethanesulfonamide) product. The product melts at 161–163° C.

From N,N' - (1 - propyltrimethylene)bis(p-bromobenzenesulfonamide) and fuming nitric acid, N,N'-(1-propyltrimethylene)bis(N-nitro - p - bromobenzenesulfonamide) product having a molecular weight of 644.4.

From N,N' - ethylenebis(1 - butanesulfonamide) and fuming nitric acid, N,N'-ethylenebis(N-nitro-1-butanesulfonamide) product melting at 55.5–57° C.

From N,N' - 2 - butenylenebis(para - chlorobenzenesulfonamide) and fuming nitric acid, in acetic anhydride, N-nitro-N,N' - 2 - butenylenebis(para-chlorobenzenesulfonamide) having a molecular weight of 480.4.

From N,N' - ethylenebis(3,4 - dichlorobenzenesulfonamide) and fuming nitric acid, N,N'-ethylenebis(3,4-dichloro-N-nitrobenzenesulfonamide) product melting, with decomposition, at 168–170° C.

From N,N' - 1,2 - cyclohexylenebis(3,4,5-trimethylbenzenesulfonamide) and fuming nitric acid, N,N'-1,2-cyclohexylenebis(N - nitro - 3,4,5 - trimethylbenzenesulfonamide) product (molecular weight of 568.7).

From N,N' - ethylenebis(m-nitrobenzenesulfonamide) and fuming nitric acid, N,N'-ethylenebis(N,m-dinitrobenzenesulfonamide) product. The product melts, with decomposition, at 185° C.

From N,N' - nonamethylenebis(methanesulfonamide) and fuming nitric acid, a white crystalline N,N'-nonamethylenebis (N - nitromethanesulfonamide) product melting at 67–69° C.

From N,N' - hexamethylenebis(meta - toluenesulfonamide) and nitronium tetrafluoroborate, N-nitro-N,N'-hexamethylenebis(meta - toluenesulfonamide) product having a molecular weight of 469.6.

From N,N'-hexamethylenebis(3,4-dichlorobenzenesulfonamide) and fuming nitric acid N,N'-hexamethylenebis (3,4-dichloro - N - nitrobenzenesulfonamide) product. The product melts at 142–144° C.

From N,N' - propylenebis(3,5 - dinitrobenzenesulfonamide) and fuming nitric acid, N,N'-propylenebis(N,3,5-trinitrobenzenesulfonamide) product (molecular weight of 624.5).

From N,N' - ethylenebis(3-nitro-p-toluenesulfonamide) and fuming nitric acid, N,N' - ethylenebis(N,3-dinitro-p-toluenesulfonamide) product which melts, with decomposition, at 183° C.

From N,N'-pentamethylenebis(2,3,4,5-tetramethylbenzenesulfonamide) and fuming nitric acid, N,N'-pentamethylenebis(2,3,4,5 - tetramethyl - N - nitrobenzenesulfonamide) product having a molecular weight of 584.7.

From N,N' - (1,4 - cyclohexylenedimethylene)bis(benzenesulfonamide) and fuming nitric acid, white crystalline N,N' - (1,4 - cyclohexylenedimethylene)bis(N-nitrobenzenesulfonamide) product. The product melts, with decomposition, at 195° C.

From N,N'-hexamethylenebis(m-nitrobenzenesulfonamide) and fuming nitric acid, N,N'-hexamethylenebis-(N,m-dinitrobenzenesulfonamide) product melting, with decomposition, at 166° C.

From N,N'-ethylenebis(3-ethyl-5-isopropylbenzenesulfonamide) and fuming nitric acid, N,N'-ethylenebis(3-ethyl-5-isopropyl - N - nitrobenzenesulfonamide) product having a molecular weight of 570.

From N,N'-hexamethylenebis(3 - nitro - p - toluenesulfonamide) and fuming nitric acid, N,N'-hexamethylenebis(N,3-dinitro-p-toluenesulfonamide) product melting at 159–160° C.

It has been discovered that the compounds of the present invention are useful in a wide variety of operations, for the modification and alteration of the growth of numerous organisms such as, for example, mite, tick, helminth, bacterial, fungal, plant, and insect organisms. In such operations, a growth altering and/or pesticidal amount of at least one of the nitrosulfonamide compounds is employed.

It has been further discovered that the exposure of a viable form of plants to the action of nitrosulfonamide compound gives rise to different responses depending upon the nature of the plant, the stage of growth or maturity of the plant, and the dosage of nitrosulfonamide compound at which the exposure is carried out. Thus, the application to plants, plant parts, and their habitats of a herbicidal amount of nitrosulfonamide compound suppresses and inhibits the growth of seeds, emerging seedlings, and established vegetation. The application to plants of a lesser and growth-stimulant amount of nitrosulfonamide compound imparts beneficial effects to the growth of the plants, such as, for example, increased size of produce, or of yield of crop; earlier plant maturation; improved qualitative content of plant parts, such as protein content in legumes and in members of the Gramineae family; delayed senescence; and the like. The application of nitrosulfonamide compound to plants may be made by contacting the compound with seeds, seedlings, established vegetation, roots, stems, flowers, fruits, and the like, or by applying the compound to soil.

The application to the organisms or their habitats of a growth altering amount of nitrosulfonamide compound is essential and critical for the practice of the present invention. The exact dosage to be supplied is dependent upon the organism, the stage of growth thereof, and, in many instances, the particular part of the organism to which the nitrosulfonamide compound is applied. Where parasite control is desired, the compounds are employed in parasiticidal amounts. Where the invention is employed to modify and alter the growth of plants, and plant parts, the compounds are employed in plant growth altering amounts, for example, nitrosulfonamide compound can be applied to plants, plant parts, and their habitats in herbicidal dosages. In foliar applications of herbicidal dosages, liquid compositions containing from about 4,000 or less to 20,000 or more parts of nitrosulfonamide compound by weight per million parts of ultimate composition can be conveniently applied to plant surfaces. In the application to growth media of herbicidal dosages of nitrosulfonamide compound, good results are obtained when the compound is supplied to the growth media in an amount of from about 5 to 300 parts or more by weight per million parts by weight of the media. Where the growth media is soil, good results are obtained when the nitrosulfonamide compound is distributed therein at a rate of from about 20 or less to 300 pounds or more per acre and through such a cross section of the soil as to provide for the presence therein of nitrosulfonamide compound in an amount of from 20 to 300 parts per million. In such application, it is desirable that the compound be distributed to a depth of at least 0.5 inch and at a substantially uniform dosage of at least 10 pounds per acre inch of soil. The weathering action of the sun, rain, and possibly the decomposition of the agents by the action of soil organisms eventually reduces their concentration in soil, or other growth media.

In other applications of the present nitrosulfonamide compounds, the active agents are employed in plant growth stimulating dosages. In such operations, good results are obtained when the compounds are applied to plants and plant parts in dosages of from 0.001 or less to 20 or more pounds per acre. In other similar operations, liquid compositions containing from about 1 to 4,000 or more parts per million can be conveniently applied to the plant surfaces. In the treatment of seed to stimulate seedling growth and obtain improved yield of the plants produced by such seeds, good results are obtained when the seeds are treated with from about 1 to 250 grams (about 0.035 to 9 ounces) of compound per hundred pounds of seed.

The method of the present invention can be carried out by exposing the organisms, or their habitats, to the action of the unmodified compounds. The present method also comprehends the employment of a liquid or dust composition containing one or more of the present compounds as an active component. In such usage, the active component is modified with one or a plurality of additaments or adjuvants for organism growth modification compositions, such as water or other liquid carriers, surface-active dispersing agents, and finely divided solids. Depending upon the concentration of active compound, such augmented compositions are adapted to be applied to the organisms and their habitats, or to be employed as concentrates and subsequently diluted with additional inert carrier to produce the ultimate treating compositions. In compositions where the adjuvant or helper is a finely divided solid, a surface-active agent or a liquid additament, the carrier cooperates with the active component so as to facilitate the invention, and to obtain an improved and outstanding result.

In addition, the present method also comprehends the employment of aerosol compositions containing one or more of the present compounds as an active agent. Such compositions are prepared according to conventional methods wherein the agent is dispersed in a solvent and the resultant dispersion mixed with a propellant in liquid state. Such variables as the particular compound to be used and the particular substrate to be treated will determine the identity of the solvent and the concentration of the active compound. The solvent should be of low phytotoxicity, such as water, acetone, isopropanol or 2-ethoxyethanol, in compositions to be applied to plants for plant stimulation and crop yield improvement.

The exact concentration of the active compound to be employed in the treating compositions is not critical and can vary considerably provided the required dosage of effective agent is supplied upon the organism or its habitat. The concentration of the active agent in liquid compositions employed to supply the desired dosage generally is from about 0.0001 to 50 percent by weight. Concentrations of up to 95 percent by weight are oftentimes conveniently employed. In dusts, the concentration of active component can be from about 0.01 to 20 percent by weight. In compositions to be employed as concentrates, the active component can be present in a concentration of from about 5 to 98 percent by weight.

The quantity of the composition applied is not critical provided only that the required dosage of active component is applied in sufficient of the finished composition to cover adequately the organism or habitat to be treated.

Liquid compositions containing the desired amount of active component can be obtained by dissolving the compound in an organic liquid carrier or by dispersing the active agent in water. With the water-insoluble agents, the dispersion is facilitated and conveniently accomplished with the aid of a suitable surface-active dispersing agent such as an ionic or non-ionic emulsifying agent. The aqueous compositions can contain one or more water-immiscible solvents for the active agent. In such compositions, the carrier can comprise an aqueous emulsion, that is, a mixture of water-immiscible solvents, emulsifying agent and water. The choice of dispersing and emulsifying agent and the amount thereof employed is dictated by the nature of the composition type and by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyethylene derivatives of sorbitan esters, complex alcohols, mahogany soaps and the like.

In the preparation of dust compositions, the active component is dispersed in and on a finely divided solid which is non-reactive with the active agent. Suitable finely divided solids are talc, chalk, gypsum, and the like. In such operations, the finely divided carrier is mixed with the active compound or a volatile organic solvent solution thereof. Similarly, dust compositions containing the active compounds are prepared from various of the solid surface-active dispersing agents, such as bentonite, fuller's earth, attapulgite and other clays. Depending upon the proportion of ingredients, the dust compositions can be employed as concentrates and subsequently diluted with additional solid surface-active dispersing agent or with talc, chalk, or gypsum and the like to obtain the desired amount of active component in compositions adapted to be applied to the organisms or their habitats. Also, such concentrated dust compositions can be dispersed in water with or without the aid of a dispersing agent, to form spray mixtures. Preferred finely divided solid adjuvants include those which are of low phytotoxicity to plants and plant parts.

When operating in accordance with the present invention, the active agents or compositions containing the agents are applied to the organisms or their habitats in growth-modifying amounts in any convenient fashion, for example, with power dusters, boom and hand sprayers, and spray dusters. In another procedure, the agents or compositions containing the same are drilled into soil and further distributed therein in conventional procedures.

The following examples illustrate the best manner of employing the present invention, and, without more, will enable those skilled in the art to employ the method of the present invention.

Example 4

Compositions containing the compounds of the present invention are prepared in various procedures. In one procedure, four parts by weight of one of the nitrosulfonamide compounds, 0.08 part of sorbitan trioleate (Span 85) and 0.02 part of a sorbitan monolaurate polyoxyethylene derivative (Tween 80) are dispersed in forty milliliters of acetone to produce a concentrate composition in the form of a water-dispersible liquid.

In another procedure, one of the nitrosulfonamide compounds is formulated in water with an alkyl aryl sulfonate (Nacconol NR) and a substituted benzoid alkyl sulfonic acid (Daxad No. 27) to produce aqueous compositions. In such operations, the materials are ballmilled together to produce compositions containing varying amounts of one of the active agents, 300 parts by weight of Nacconol NR and 300 parts by weight of Daxad No. 27 per million parts by weight of ultimate aqueous mixture. In this manner, ballmilled compositions are prepared from all of the nitrosulfonamide compounds of the above examples.

Example 5

Liquid compositions are prepared with N,N' - pentamethylenebis(N - nitrobenzenesulfonamide), N,N' - pentamethylenebis(N - nitromethanesulfonamide), N,N'-ethylenebis(N - nitroethanesulfonamide), N,N' - hexamethylenebis(N - nitroethanesulfonamide), N,N' - hexamethylenebis(3,4 - dichloro - N - nitrobenzenesulfonamide), and N,N' - ethylenebis(N,3 - dinitro - p-toluenesulfonamide) in the ballmilling procedure described in Example 4 and each containing an amount of one of the named active agents.

These compositions are employed for the treatment of seed beds of sandy loam soil of good nutrient content. Prior to the treatment, the soil is seeded with the seeds of peas (*Pisum sativum*) and beans (*Phaseolus vulgaris*). In the treating operations, the composition is applied as a soil drench and at a rate of about 0.434 acre inch of aqueous composition per acre to supply varying amounts of one of the compounds per acre and varying concentrations of one of the compounds in the soil. Other areas similarly seeded with the named plant species are left untreated to serve as checks. Following the treating operations, the seed beds are observed at regular intervals to ascertain any appreciable effects upon the germination of the seeds and the growth of the seedlings.

Two weeks following the treating operations, the average height of the plants above the ground line in the treated seed beds is measured and compared with the average height above the ground line of the plants in the untreated seed beds. At the time of the measurements, all of the treated and untreated seed beds support abundant stands of healthy plants of the named species. The results of the measurements, the agents, and the concentrations and dosages at which the agents are employed are set forth in the following table.

| Test compound: | Percent greater stem elongation of treated pea plants than of untreated pea plants |
|---|---|
| N,N'-ethylenebis(N - nitroethanesulfonamide) | 22 |
| N,N'-ethylenebis(N - nitro - 1 - butanesulfonamide) | 50 |
| N,N' - ethylenebis(3,4 - dichloro - N - nitrobenzenesulfonamide) | 34 |
| N,N' - ethylenebis(N,m - dinitrobenzenesulfonamide) | 47 |
| N,N' - hexamethylenebis(3,4 - dichloro - N-nitrobenzenesulfonamide) | 20 |
| N,N' - ethylenebis (N,3 - dinitro - p - toluenesulfonamide) | 30 |
| N,N' - hexamethylenebis(N,m - dinitrobenzenesulfonamide) | 30 |

Example 7

Liquid compositions are prepared with N,N'-tetramethylenebis(N - nitromethanesulfonamide), N,N'-ethylenebis(N-nitrobenzenesulfonamide), and N,N'-ethylenebis(N-nitro-1-butanesulfonamide) in the ballmilling procedure described in Example 4 and each containing an amount of one of the named active agents.

| Test Compound | Concentration of Test Compound in Composition | Dosage of Test Compounds | | Percent Greater Stem Elongation of Plants from Treated Soil than from Untreated Soil | |
|---|---|---|---|---|---|
| | | Pounds per acre | Parts per million by weight of soil | Peas | Beans |
| N,N'-pentamethylenebis(N-nitrobenzenesulfonamide) | 0.0086 | 1 | 1.6 | 46 | 25 |
| N,N'-pentamethylenebis(N-nitromethanesulfonamide) | 0.0086 | 1 | 1.6 | 26 | 15 |
| N,N'-ethylenebis(N-nitroethanesulfonamide) | 0.0086 | 1 | 1.6 | 15 | 26 |
| | 0.0432 | 5 | 8 | 50 | 50 |
| N,N'-hexamethylenebis(N-nitroethanesulfonamide) | 0.0086 | 1 | 1.6 | 35 | 26 |
| N,N'-hexamethylenebis(3, 4-dichloro-N-nitrobenzenesulfonamide) | 0.0432 | 5 | 8 | 114 | 30 |
| N,N'-ethylenebis(N,3-dinitro-p-toluenesulfonamide) | 0.0086 | 1 | 1.6 | 114 | 30 |
| | 0.0432 | 5 | 8 | 114 | 30 |

Example 6

Aqueous spray composition each containing 100 parts by weight of one of various nitrosulfonamide compounds per million parts by weight of ultimate mixture are prepared in accordance with the foregoing examples. These compositions are employed in post emergent applications for the treatment of pea plants (*Pisum sativum*). In the treating operations, the compositions are applied as foliage sprays to plots of the pea plants. At the time of the applications, the plants are from two to four inches in height. The treatments are carried out with conventional spraying equipment, the applications being made to the point of run-off. Similar plots of pea plants are left untreated to serve as checks.

Two weeks following the treating operations, the average height above the ground line of the treated pea plants is measured and compared with the average height above the ground line of the untreated pea plants. At the time of the measurements, all of the treated and untreated plots support stands of pea plants in healthy condition. The test compounds employed and the results of the measurements are set forth in the following table.

Also, concentrate composition is prepared as described in Example 4 from N,N'-hexamethylenebis(N-nitromethanesulfonamide) and the resulting concentrate dispersed in water to prepare an aqueous composition containing an amount of the named active agent.

In procedures essentially identical with those employed in Example 5, these aqueous compositions are employed for the plant growth modification of bean plants. The results of the measurements together with the agents, concentrations, and dosages at which they are employed are set forth in the following table.

| Test Compound | Concentration of Test Compound in Composition | Dosage of Test Compounds | | Percent Greater Stem Elongation of Bean Plants from Treated Soil than from Untreated Soil |
|---|---|---|---|---|
| | | Pounds per acre | Parts per million by weight of soil | |
| N,N'-hexamethylenebis(N-nitromethanesulfonamide) | 0.0432 | 5 | 8 | 21 |
| N,N'-tetramethylenebis(N-nitromethanesulfonamide) | 0.0086 | 1 | 1.6 | 50 |
| N,N'-ethylenebis(N-nitrobenzenesulfonamide) | 0.0086 | 1 | 1.6 | 25 |
| | 0.0432 | 5 | 8 | 25 |
| N,N'-ethylenebis(N-nitro-1-butanesulfonamide) | 0.0086 | 1 | 1.6 | 36 |
| | 0.0432 | 5 | 8 | 72 |

The hydrocarbonylenedisulfonamide starting material is prepared in known procedures in which a hydrocarbonylenediamine compound of the formula

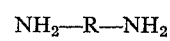

$$NH_2-R-NH_2$$

is reacted with a sulfonyl chloride compound of the formula

$$R'-SO_2-Cl$$

in the presence of a hydrogen halide acceptor.

The reaction is conveniently carried out in the presence of an inert liquid reaction medium, for example, water, benzene, chloroform, methylene chloride, carbon tetrachloride, and hexane. The amounts of the reactants to be employed are not critical, desired product compound being obtained when employing the reactants in any amounts. The reaction consumes the reactants in amounts which represent one molecular proportion of hydrocarbonylenediamine compound, two molecular proportions of sulfonyl chloride compound, and two molecular proportions of hydrogen halide acceptor. Higher yields result from use of one molecular proportion of hydrocarbonylenediamine compound, four or more molecular proportions of sulfonyl chloride compound, and two or more molecular proportions of hydrogen halide acceptor, and the use of such proportions is preferred.

The hydrogen halide acceptor can be of any of those conventionally employed in organic synthesis; for example, an alkali metal hydroxide, a tertiary amine, pyridine, and the like. It is sometimes convenient to employ the hydrogen halide acceptor in large excess so that it serves both as hydrogen halide acceptor and as solvent for the reactants.

The reaction takes place smoothly at temperatures between 0° and 100° C., and preferably, at temperatures of between 10° and 45° C., with the production of the desired product compound in the reaction mixture. In carrying out the reaction, the reactants and the hydrogen halide acceptor are contacted together in any convenient fashion and maintained for a period of time within the reaction temperature range to complete the reaction. The yield of desired product compound is increased by permitting the reaction mixture to stand for a period of time. Following the completion of the reaction, the desired reactant material can be separated and purified, according to procedures known by those skilled in the art.

I claim:

1. Method of stimulating plant growth which comprises applying to plants and plant parts a plant growth-stimulating amount of compound of the formula

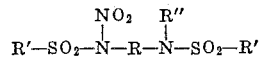

wherein R represents a divalent hydrocarbonylene radical selected from the group consisting of alkylene being of from 2 to 10, inclusive, carbon atoms, 2-butenylene, cyclohexylene, and cyclohexylenedimethylene; R' represents a member selected from the group consisting of loweralkyl being of from 1 to 4, inclusive, carbon atoms, phenyl, and phenyl radical which is ring substituted with one or more substituent moieties selected from the group consisting of halo, loweralkyl, nitro, and carboloweralkoxy, there being up to and including five substituent moieties when every substituent moiety is selected from the group consisting of halo and loweralkyl, and there being one or two substituent moieties when one of the substituent moieties is selected from the group consisting of nitro and carboloweralkoxy; and R" represents a member selected from the group consisting of hydrogen and nitro.

2. Plant growth-stimulating composition comprising from 5 to 98 percent by weight of an active ingredient in admixture with a surface active agent and a finely divided solid, the active ingredient being compound of the formula

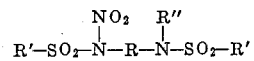

wherein R represents a divalent hydrocarbonylene radical selected from the group consisting of alkylene being of from 2 to 10, inclusive, carbon atoms, 2-butenylene, cyclohexylene, and cyclohexylenedimethylene; R' represents a member selected from the group consisting of loweralkyl being of from 1 to 4, inclusive, carbon atoms, phenyl, and phenyl radical which is ring substituted with one or more substituent moieties selected from the group consisting of halo, loweralkyl, nitro, and carboloweralkoxy, there being up to and including five substituent moieties when every substituent moiety is selected from the group consisting of halo and loweralkyl, and there being one or two substituent moieties when one of the substituent moieties is selected from the group consisting of nitro and carboloweralkoxy; and R" represents a member selected from the group consisting of hydrogen and nitro.

3. The composition which comprises an aqueous dispersion of the composition claimed in claim 2, the active ingredient in such composition being present in the amount of at least 0.0001 percent by weight.

References Cited

UNITED STATES PATENTS

| | | | |
|---|---|---|---|
| 2,828,300 | 3/1958 | Glahn et al. | 260—556 X |
| 3,052,642 | 9/1962 | Hunter | 260—556 X |

OTHER REFERENCES

Beilstein's Handbuch der Organischen Chemie, vol. 11, pp. 50 and 53 (System No. 1520), Julius Springer, Berlin, Germany (1928).

Degering: An Outline of Organic Chemistry, sixth edition, p. 241, Barnes and Noble Inc., N.Y. (1951).

JAMES O. THOMAS, JR., *Primary Examiner.*